Dec. 31, 1935.  H. P. RAPINET  2,026,001
ADJUSTABLE WRENCH
Filed March 21, 1935
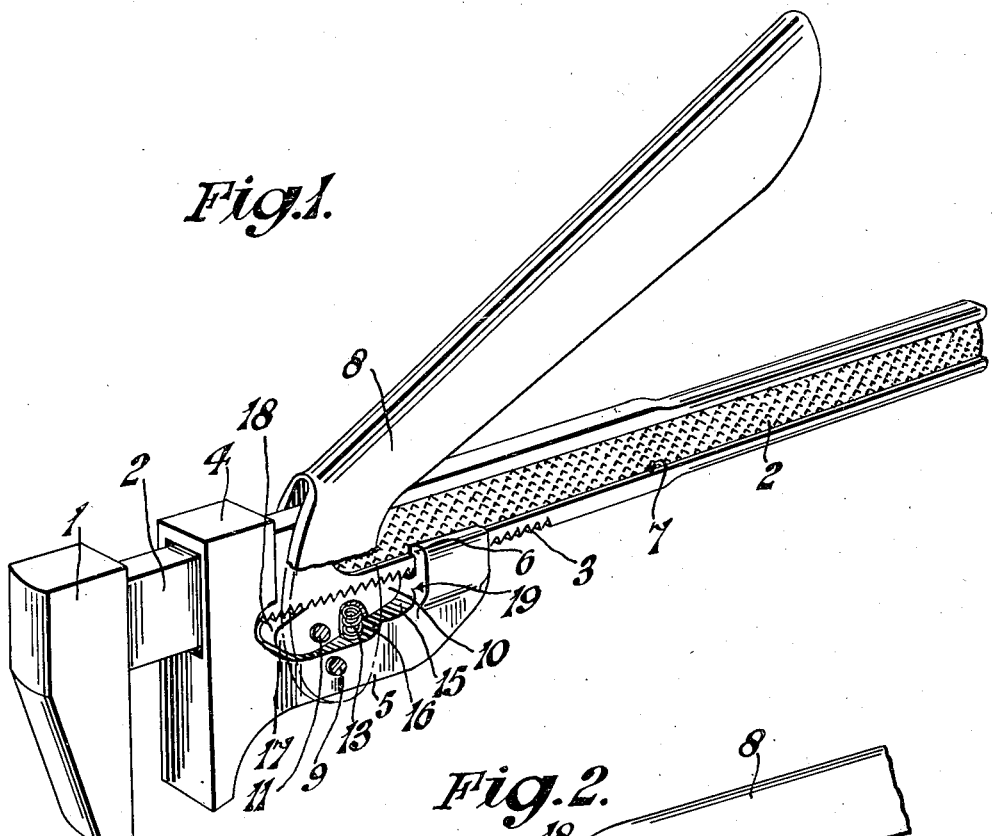
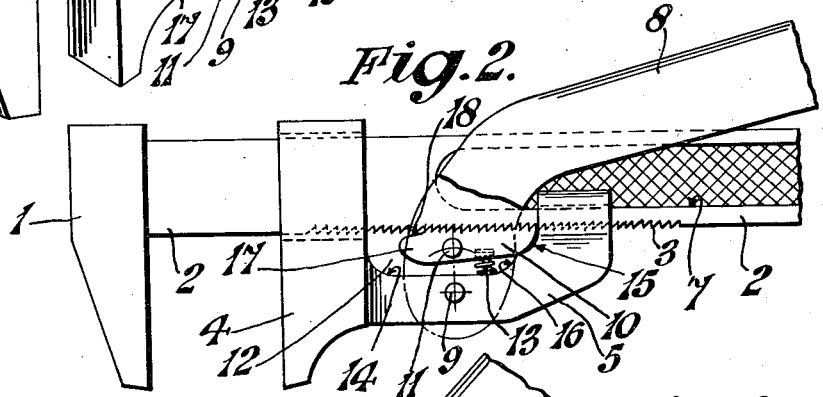
INVENTOR.
H. P. RAPINET.
By Blair & Kilcoyne
Att'ys Patented Dec. 31, 1935

2,026,001

UNITED STATES PATENT OFFICE 2,026,001

ADJUSTABLE WRENCH

Hamilton Percival Rapinet, London, England

Application March 21, 1935, Serial No. 12,275
In Great Britain January 29, 1935

5 Claims. (Cl. 81—89)

This invention relates to adjustable wrenches of the lever operated type in which the movable jaw is locked in the adjusted positions by a dog associated with the lever and engageable with the shank of the fixed jaw of the wrench, preferably in such a manner that a final closing movement is imparted to the movable jaw after engagement has taken place between the dog and the aforesaid shank.

The object of the present invention is to effect improvements in adjustable wrenches of the above general character.

An adjustable wrench according to the present invention broadly comprises a fixed jaw mounted upon the upper end of a shank, a combined movable jaw and leg slidable along said shank, a dog situated between said leg and shank and adapted to hold the movable jaw in the adjusted positions by engaging said shank and an operating lever engaging said leg and said dog through separate spaced pivots the arrangement being such that movement of the lever in one direction serves to impart a final closing movement to the movable jaw and movement of the lever in the opposite direction serves to effect disengagement between the dog and the shank.

In an adjustable wrench according to a preferred embodiment of the invention the movements imparted by the lever to the movable jaw relative to the dog are utilized in one direction positively to hold the dog in engagement with the shank of the fixed jaw and in the opposite direction positively to withdraw the dog from engagement with the shank.

In order that the invention may be clearly understood and carried into effect a practical example of such an embodiment will now be described, by way of example, by aid of the accompanying drawing in which:—

Fig. 1 is a part sectional perspective view of the improved wrench.

Fig. 2 is a side elevation of the forward end of the same showing the relative positions of the parts when the dog is in the engaged position.

Fig. 3 is a view similar to Fig. 2 but showing the relative positions of the parts when the dog has been withdrawn from the engaged position.

The wrench illustrated has a fixed jaw 1 mounted upon the upper end of a shank 2 the inner edge of which is formed with a series of buttress teeth 3. Slidably mounted upon the shank 2 is a movable jaw 4 which is formed integral with a leg 5 the lower end 6 of which is channelled and its lips inturned to slidably engage the shank 2 at its inner edge which is flanged as at 7 for the purpose.

Adjustment of the movable jaw along the shank 2 is effected by means of an operating lever 8, the inner end of which is forked and suitably bent as shown to ensure that the outer or handle portion shall assume an easy operative position in relation to the shank 2. The furcations at the forked end of the lever straddle both the shank 2 and the leg 5 of the movable jaw to which latter they are attached by a pivot pin 9.

The movable jaw is locked in the adjusted positions by means of a toothed dog 10 which is situated between the legs of the forked end of the operating lever to which it is attached by the pivot pin 11, within a gap 12 formed in the leg 5 between the head of the movable jaw and the lower end 6, the toothed face of the dog opposing the toothed edge of the shank 2. A spring 13 is provided, situated within a pocket in the dog, to bias the dog towards the position where its teeth engage in the teeth on the opposing face of the shank 2.

The forward end of the gap 12 is rounded as indicated at 14 whilst the rear end of the gap is stepped to provide two shaped surfaces, an upper 15 and a lower 16. The corresponding ends of the dog are also preformed, the forward end 17 being bull nosed and devoid of teeth for a portion of the length of the dog as at 18 and the rear end rounded off on its underside as indicated at 19. A further feature in the present embodiment is the situation of the pivot pin 11 forward of the centre of the dog for a purpose which will hereafter be apparent.

To apply the wrench to a nut the handle portion of the lever 8 is turned outwards to the position shown in Fig. 3. This results in the opposing ends 12 and 17 of the gap and the dog respectively coming into contact with the result that the continued upward or outward movement of the lever causes the rounded end 17 of the dog to rise up the correspondingly rounded face 12 of the gap and this in turn causes the rear end of the dog to turn downwards about the pivot pin 11 and to withdraw from engagement with the teeth on the face of the shank 2. The movable jaw is now free to be moved along the shank 2 to close in about the nut to be engaged. When the nut is engaged between the two jaws with sufficient exactitude the lever is pulled inwards by the operator towards the shank during which movement the dog is first freed allowing the spring 13 to force the same into engagement with the opposing teeth on the shank. The continued inward movement of the lever then imparts a final forward or closing movement to the movable jaw and this final movement of the jaw causes the upper surface 15 to engage under the rounded surface 19 of the dog and so force or jam the same into tight engagement with the teeth on the shank 2 whilst the operation on the engaged nut is being performed. Slip between the dog and the shank is thus positively prevented.

What I claim is:—

1. An adjustable wrench comprising a fixed jaw mounted upon the outer end of a shank, a combined movable jaw and leg slidable along said shank, said leg having a gap on the side opposing said shank, a dog located in said gap adapted to hold the movable jaw in the adjusted positions by engaging said shank, an operating lever having its outer end on the upper side of the shank and its inner end crossing the shank and engaging both the dog and the leg of the movable jaw by separate and spaced pivots, coacting means at the forward end of the dog and said gap for positively disengaging the dog from the shank when the operating lever is opened or released by the resulting combined pivotal movements of the operating lever and the dog about their connecting pivots and further coacting means at the rear end of the dog and said gap for positively forcing said dog into engagement with said shank when the operating lever is closed by being pulled downwards towards the upper side of the shank.

2. An adjustable wrench comprising a fixed jaw mounted upon the outer end of a shank, a combined movable jaw and leg slidable along said shank, said leg having a gap on the side opposing said shank, a dog located in said gap adapted to hold the movable jaw into the adjusted positions by engaging said shank, an operating lever having its outer end on the upper side of the shank and its inner end crossing the shank and engaging both the dog and the leg of the movable jaw by separate and spaced pivots, coacting means at the forward end of the dog and said gap for positively disengaging the dog from the shank when the operating lever is opened or released by the resulting combined pivotal movements of the operating lever and the dog about their connecting pivots, said means consisting of a rounded bull nose on the forward end of the dog and a curved surface at the corresponding end of the gap which when engaged by the rounded nose of the dog in its forward movement causes the dog to turn about its pivot and retract its rear end away from engagement with the shank.

3. An adjustable wrench comprising a fixed jaw mounted upon the outer end of a shank, a combined movable jaw and leg slidable along said shank, said leg having a gap on the side opposing said shank, a dog located in said gap adapted to hold the movable jaw in the adjusted positions by engaging said shank, an operating lever having its outer end on the upper side of the shank and its inner end crossing the shank and engaging both the dog and the leg of the movable jaw by separate and spaced pivots, coacting means at the forward end of the dog and said gap for positively disengaging the dog from the shank when the operating lever is opened or released by the resulting combined pivotal movements of the operating lever and the dog about their connecting pivots and further coacting means at the rear end of the dog and said gap for positively forcing said dog into engagement with said shank when the operating lever is closed by being pulled downwards towards the upper side of the shank, said means consisting of a spring interposed between the under side of the dog and the gap in combination with a step at the rear end of the gap, cut to provide upper and lower shaped surfaces and a correspondingly curved under surface at the rear end of the dog, engagement between said curved end of the dog and the stepped end of the gap as a result of the upward or closing movement of the operating lever causing the rear end of the dog to ride up the stepped surfaces assisted by the action of the spring so as positively to hold the dog in engagement with the shank.

4. An adjustable wrench comprising a fixed jaw mounted upon the outer end of a shank, a combined movable jaw and leg slidable along said shank, said leg having a gap on the side opposing said shank, a dog located in said gap adapted to hold the movable jaw in the adjusted positions by engaging said shank, an operating lever having its outer end on the upper side of the shank and its inner end crossing the shank and engaging both the dog and the leg of the movable jaw by separated and spaced pivots, coacting means at the forward end of the dog and said gap for positively disengaging the dog from the shank when the operating lever is opened or released by the resulting combined pivotal movements of the operating lever and the dog about their connecting pivots, said means consisting of a rounded bull nose on the forward end of the dog and a curved surface at the corresponding end of the gap which when engaged by the rounded nose of the dog in its forward movement causes the dog to turn about its pivot and retract its rear end away from engagement with the shank, and further coacting means at the rear end of the dog and said gap for positively forcing said dog into engagement with said shank when the operating lever is closed by being pulled downwards towards the upper side of the shank, said means consisting of a spring interposed between the under side of the dog and the gap in combination with a step at the rear end of the gap cut to provide upper and lower shaped surfaces and a correspondingly curved under surface at the rear end of the dog, engagement between said curved end of the dog and the stepped end of the gap as a result of the inward or closing movement of the operating lever causing the rear end of the dog to ride up the stepped surfaces assisted by the action of the spring so as positively to hold the dog in engagement with the shank.

5. An adjustable wrench comprising a fixed jaw mounted upon the outer end of a shank, a combined movable jaw and leg slidable along said shank, a dog adapted to hold the movable jaw in the adjusted positions by engaging said shank, an operating lever engaging said dog and said combined movable jaw and leg, a surface on said combined movable jaw and leg adapted to coact with one end of the dog during movement of the operating lever in one direction to effect positive disengagement of the dog from said shank and a further surface at the other end of said combined movable jaw and leg adapted to coact with the opposite end of the dog during movement of the operating lever in the opposite direction for positively holding said dog in engagement with said shank as a result of a final and relative movement between said movable jaw and said dog.

HAMILTON PERCIVAL RAPINET.